(12) United States Patent
Koga et al.

(10) Patent No.: US 10,391,689 B2
(45) Date of Patent: Aug. 27, 2019

(54) METHOD FOR MANUFACTURING SUBSTRATE-INTEGRATED GASKET

(71) Applicant: NOK CORPORATION, Tokyo (JP)

(72) Inventors: Shotaro Koga, Fujisawa (JP); Yuichi Kuroki, Fujisawa (JP)

(73) Assignee: NOK Corporation (JP)

( * ) Notice: Subject to any disclaimer, the term of this patent is extended or adjusted under 35 U.S.C. 154(b) by 936 days.

(21) Appl. No.: 14/781,176

(22) PCT Filed: Apr. 7, 2014

(86) PCT No.: PCT/JP2014/060065
§ 371 (c)(1),
(2) Date: Sep. 29, 2015

(87) PCT Pub. No.: WO2014/171357
PCT Pub. Date: Oct. 23, 2014

(65) Prior Publication Data
US 2016/0052182 A1  Feb. 25, 2016

(30) Foreign Application Priority Data

Apr. 16, 2013 (JP) ................................. 2013-085641

(51) Int. Cl.
*B29C 45/32* (2006.01)
*B29C 45/14* (2006.01)
(Continued)

(52) U.S. Cl.
CPC ........ *B29C 45/14336* (2013.01); *B29C 45/32* (2013.01); *B29C 45/322* (2013.01);
(Continued)

(58) Field of Classification Search
CPC .. B29C 45/14376; B29C 45/32; B29C 45/322
(Continued)

(56) References Cited

U.S. PATENT DOCUMENTS

2013/0154150 A1   6/2013   Shimazoe et al.

FOREIGN PATENT DOCUMENTS

EP    2278195 A1    1/2011
EP    2612748 A1    7/2013
(Continued)

OTHER PUBLICATIONS

Extended European Search Report for Patent Application No. 14785002.8, dated Dec. 8, 2015 (5 pages).

*Primary Examiner* — Christina A Johnson
*Assistant Examiner* — Xue H Liu
(74) *Attorney, Agent, or Firm* — Harness, Dickey & Pierce, P.L.C.

(57) ABSTRACT

The invention provides a method for manufacturing a substrate-integrated gasket, the method integrating a fiber substrate which is constructed by a pulp fiber having cellulose as a main component and a gasket body which is constructed by a rubber-like elastic body according to a rubber impregnation, wherein a plurality of substrate-integrated gaskets are obtained by executing an injection molding by plural stages of rubber metal molds. Further, the rubber material is filled in plural stages of metal mold cavities by passing the rubber material through the fiber substrate in which a rubber material flow channel in the metal mold is closed at its injection pressure. The invention can reduce a man hour for removing burr and cleaning a metal mold by suppressing generation of rubber burr at the molding time and can reduce an amount of disposal of a molding material, thereby achieving a good manufacturing efficiency.

2 Claims, 5 Drawing Sheets

(51) Int. Cl.
    *B29L 31/34*     (2006.01)
    *B29L 7/00*      (2006.01)
    *B29K 21/00*     (2006.01)
    *B29K 711/12*    (2006.01)

(52) U.S. Cl.
    CPC ....... *B29K 2021/00* (2013.01); *B29K 2711/12* (2013.01); *B29L 2007/002* (2013.01); *B29L 2031/3468* (2013.01)

(58) Field of Classification Search
    USPC ....................................................... 264/257
    See application file for complete search history.

(56)         References Cited

FOREIGN PATENT DOCUMENTS

| | | | |
|---|---|---|---|
| JP | S61-40129 A | 2/1986 | |
| JP | 2006-026923 A | 2/2006 | |
| JP | 2010-282940 A | 12/2010 | |
| JP | 2011096419 A | 5/2011 | |
| JP | 2011-113768 A | 6/2011 | |
| JP | 2012-071574 A | 4/2012 | |
| WO | WO-2012029444 A1 * | 3/2012 | ....... B29C 45/14344 |

* cited by examiner

METHOD FOR MANUFACTURING SUBSTRATE-INTEGRATED GASKET

CROSS-REFERENCE TO RELATED APPLICATIONS

This application is a U.S. National Phase Application under 35 U.S.C. 371 of International Application No. PCT/JP2014/060065, filed on Apr. 7, 2014 and published in Japanese as WO 2014/171357 A1 on Oct. 23, 2014. This application claims priority to Japanese Patent Application No. 2013-085641, filed on Apr. 16, 2013. The entire disclosures of the above applications are incorporated herein by reference.

BACKGROUND OF THE INVENTION

Field of the Invention

The present invention relates to a method for manufacturing a gasket according to a sealing technique, and more particularly to a method for manufacturing a substrate-integrated gasket in which a gasket body is integrally formed in relation to a substrate. The substrate-integrated gasket according to the present invention is used, for example, as a gasket for a fuel battery, or the other general gasket.

Description of the Conventional Art

For the popularization of the fuel battery in the future, downsizing and cost reduction of a separator and the gasket are necessary. With regard to the gasket, a gasket constructed by a rubber simple substance is promising, however, there is a problem that a man hour is increased by treating the burr at the molding time and handling in a step. For example, if a gap d exists in a metal mold 52 due to lack of flatness and parallelism as shown in FIG. 7B in the case that a gasket 51 shown in FIG. 7A is manufactured, a thin film-like rubber burr 53 is generated as shown in FIG. 7C, and a man hour for removing the burr and cleaning the metal mold is necessary. Further, a molded product after the burr treatment has a problem in its handling property, for example, a twisting tends to be generated in the molded product. An increase of a man-hour after mold releasing of the molded product is unavoidable in a multiple stages of impressions. Further, the gasket constructed by the rubber simple substance is hard to be chucked at the handling time in the step.

Further, it is possible to reduce an amount of disposal of a molding material (a rubber material) by employing an injection molding, in the gasket, however, if a plurality of product cavity spaces are arranged on the same plane of a metal mold (in a direction which is orthogonal to a mold clamping and mold opening direction of the metal mold) of the metal mold in the case that a plurality of gaskets are simultaneously molded by using a metal mold, the metal mold is enlarged in size and a manufacturing efficiently is not good.

A technique of simultaneously molding a plurality of molded products by using a metal mold is described in Japanese Unexamined Patent Publication No. 2006-026923, however, the prior art is a molding machine for a compression molding, not for the injection molding.

SUMMARY OF THE INVENTION

Problem to be Solved by the Invention

The present invention is made by taking the above point into consideration, and an object of the present invention is to provide a method for manufacturing a substrate-integrated gasket which can reduce a man hour for removing burr and cleaning a metal mold by suppressing generation of rubber burr at the molding time. Further, the object of the present invention is to provide a method for manufacturing a substrate-integrated gasket which can reduce an amount of disposal of a molding material and can prevent a metal mold from being enlarged in size on a plane when a plurality of gaskets are simultaneously molded by using the metal mold, thereby achieving a good manufacturing efficiency.

Means for Solving the Problem

In order to achieve the object, a method for manufacturing a substrate-integrated gasket according to a first aspect of the present invention is a method for manufacturing a substrate-integrated gasket, the method integrating a fiber substrate which is constructed by a pulp fiber having cellulose as a main component and a gasket body which is constructed by a rubber-like elastic body according to a rubber impregnation, wherein a plurality of substrate-integrated gaskets are obtained by executing an injection molding by plural stages of rubber metal molds.

Further, a method for manufacturing a substrate-integrated gasket according to a second aspect of the present invention is the manufacturing method described in the first aspect, wherein the rubber material is filled in plural stages of metal mold cavities by passing the rubber material through the fiber substrate in which a rubber material flow channel in the metal mold is closed at its injection pressure.

Further, a method for manufacturing a substrate-integrated gasket according to a third aspect of the present invention is the manufacturing method described in the first or second aspect, wherein the rubber material immobilizes fiber entanglement of the fiber substrate by the rubber impregnation after cross-linking.

Further, a method for manufacturing a substrate-integrated gasket according to a fourth aspect of the present invention is the manufacturing method described in the first, second or third aspect, wherein the substrate-integrated gasket is a gasket for a fuel battery.

In the manufacturing method according to the present invention having the structure mentioned above, the substrate-integrated gasket is manufactured by integrating (integrally molding) a water-insoluble fiber material, specifically the fiber substrate which is constructed by the pulp fiber having the cellulose as the main component, and the gasket body which is constructed by the rubber-like elastic body. The fiber substrate is a porous substrate, and an integration of the rubber with the porous substrate does not require any adhesive agent, but is achieved by a rubber impregnation with the substrate. A liquid-like rubber is used as a rubber material in the impregnation. Further, in relation to the filling of the rubber material into the metal mold cavity, since the rubber material is filled into plural stages of metal mold cavities by passing the rubber material through the fiber substrate in which the rubber material flow channel in the metal mold is closed with its injection pressure, it is not necessary to process any through holes (penetrating holes) as a material flow path in the fiber substrate.

Generally, paper has an impression of being soluble in water, however, fiber dispersibility in the water is suppressed by controlling the fiber entanglement due to a fiber length, and the cellulose fiber of the main component has water resistance, acid resistance and basic. There is fear that swelling of the cellulose by the water generates breakage of the fiber. The fiber entanglement is kept by immobilizing the fiber entanglement by the liquid rubber impregnation, and the swelling of the fiber is suppressed by the impregnated rubber around the fiber.

The rubber burr generation is suppressed at the molding time and the man hour for treating the burr and cleaning the metal mold is reduced, by executing an insert molding while using the fiber substrate as an insert part. Further, since the gasket having the substrate is excellent in a handling property in the step after molding, the gasket can be put to practical use for automating the handling.

On the other hand, a plurality of gaskets can be obtained by using the rubber metal mold which is constructed by the plural stages, however, the effect achieved by obtaining a plurality of gaskets is not actually so great due to the burr treatment and the increase of the handling man hour. However, the burr treatment is not necessary and the fiber substrate portion can be put to practical use for handling, by making good use of the features mentioned above, and it is possible to widely reduce a cost for processing the rubber. It is possible to put the conventional substrate-integrated gasket technique to practical use, for example, the rubber is formed in a part of the fiber substrate portion for adding the handling function. Further, it is possible to reduce a part cost by using an inexpensive copy paper for the fiber substrate.

Effect of the Invention

The present invention achieves the following effects.

More specifically, according to the present invention, since the fiber substrate constructed by the pulp fiber having the cellulose as the main component is used as the substrate and the fiber substrate compensates the lack of the flatness and the parallelism of the metal fiber and can close the gap in the metal mold parting portion as mentioned above, it is possible to suppress the generation of the rubber burr at the molding time, and it is possible to reduce the man hour for treating the burr and cleaning the metal mold. Since the substrate-integrated gasket is provided with the substrate, the substrate-integrated gasket is excellent in the handling property in the step after molding. Since the fiber substrate is the porous substrate and the rubber material passes through the fiber substrate by the injection pressure, it is not necessary to provide any through hole. Since the rubber material immobilizes the fiber entanglement of the fiber substrate after cross-linking, it is possible to suppress dispersion and swelling of the fiber. Further, since the injection molding is executed when the gasket is molded by using the metal mold, it is possible to reduce an amount of disposal of the molding material. Further, since a plurality of gaskets are obtained by using the rubber metal mold constructed by the plural stages, the metal mold is not enlarged in size on the plane. As a result, it is possible to improve a manufacturing efficiency, for example, an installation area of the metal mold can be made small. Further, the substrate-integrated gasket is, for example, the gasket for the fuel battery. Accordingly, it is possible to achieve the operations and effects mentioned above in the technical field of manufacturing the gasket for the fuel battery.

DETAILED DESCRIPTION OF PREFERRED EMBODIMENT

Next, a description will be given of an embodiment according to the present invention with reference to the accompanying drawings.

Figure 1:
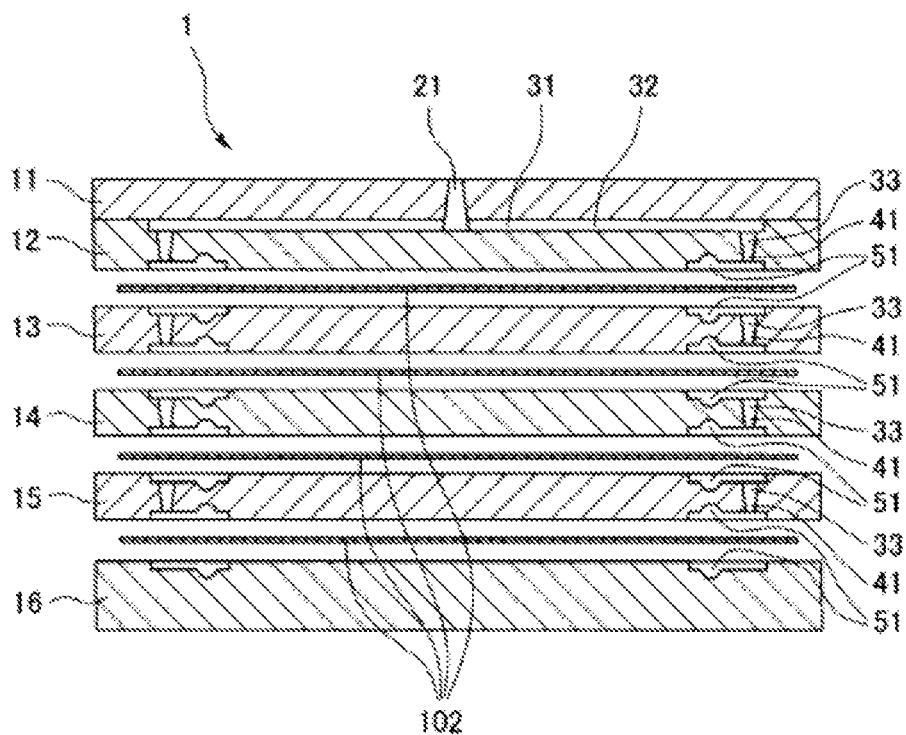
FIG. 1 is a cross sectional view showing a state at the mold opening time of a metal mold which is used for executing a manufacturing method according to an embodiment of the present invention and before injection.

FIG. 1 shows a cross section of a metal mold 1 which is used for executing a manufacturing method according to an embodiment of the present invention. The metal mold 1 is a rubber metal mold for injection molding, and is structured such that a plurality of (four in the embodiment) product cavity spaces 51 having the same shape and the same magnitude are provided side by side at a predetermined distance in a mold claming and mold opening direction (a vertical direction in the drawing) of the metal mold 1, and a plurality of (four in the embodiment) molded products (substrate-integrated gaskets) having the same shape and the same magnitude can be simultaneously molded by using the metal mold 1.

Further, the metal mold 1 is provided with six split molds, that is, first to six split molds 11 to 16 which are arranged so as to be laminated in the mold clamping and mold opening direction of the metal mold 1, and the product cavity spaces 51 are provided respectively in a parting portion between a second mold (a first intermediate mold) 12 and a third mold (a second intermediate mold) 13, a parting portion between the third mold 13 and a fourth mold (a third intermediate mold) 14, a parting portion between the fourth mold 14 and a fifth mold (a fourth intermediate mold) 15 and a parting portion between the fifth mold 15 and a sixth mold (a lower mold) 16, except a first mold (an upper mold) 11 which is provided with a sprue 21.

Since the metal mold 1 is assumed to obtain a plurality of gaskets for fuel battery constructed by rubber-like elastic bodies (liquid rubbers) formed into a rectangular frame shape in plane, each of a plurality of product cavity spaces 51 is formed into a rectangular frame shape in plane.

Further, since the metal mold 1 is assumed to integrally mold (insert mold) a double-side type gasket for a fuel battery in a state in which a plate-like fiber substrate 102 constructed by a pulp fiber having cellulose as a main component is set as a plate-like insert part, the plate-like fiber substrates 102 are arranged respectively between the second mold 12 and the third mold 13, between the third mold 13 and the fourth mold 14, between the fourth mold 14 and the fifth mold 15, and between the fifth mold 15 and the sixth mold 16.

Further, the metal mold 1 is provided with the sprues 21, runners 31 and gates 41 which are communicated with a plurality of product cavity spaces 51.

The sprue 21 is open so as to nozzle touch in a plane center of the first mold 11, and is provided up to an upper surface of the second mold 12 just below the first mold 11 from the plane center of the first mold 11 toward one direction (a downward direction in the drawing) of the mold clamping and mold opening direction of the metal mold 1.

The runner 31 is provided with an orthogonal runner portion 32 extended toward a direction (a lateral direction in the drawing) which is orthogonal to the mold clamping and mold opening direction of the metal mold 1 from the sprue 21, and a parallel runner portion 33 extended toward one of directions which are parallel to the mold clamping and mold opening direction of the metal mold 1 from a leading end of the orthogonal runner portion 32. The orthogonal runner portion 32 is provided on an upper surface of the second mold 12 which is provided with the sprue 21. The parallel runner portion 33 is provided on the same plane as a plurality of product cavity spaces 51. As a result, the parallel runner portion 33 and the product cavity spaces 51 are alternately provided in a vertical direction. A specific structure is as follows.

Since the second mold 12 is provided on its lower surface with an upper half space of the product cavity space 51 in a first stage as well as being provided on its upper surface with the orthogonal runner portion 32, the parallel runner portion 33 in the first stage is provided so as to communicate the orthogonal runner portion 32 with the product cavity space 51 in the first stage.

Since the third mold 13 is provided on its lower surface with an upper half space of the product cavity space 51 in a second stage as well as being provided on its upper surface with a lower half space of the product cavity space 51 in the first stage, the parallel runner portion 33 in the second stage is provided so as to communicate the product cavity space 51 in the first stage with the product cavity space 51 in the second stage.

Since the fourth mold 14 is provided on its lower surface with an upper half space of the product cavity space 51 in a third stage as well as being provided on its upper surface with a lower half space of the product cavity space 51 in the second stage, the parallel runner portion 33 in the third stage is provided so as to communicate the product cavity space 51 in the second stage with the product cavity space 51 in the third stage.

Since the fifth mold 15 is provided on its lower surface with an upper half space of the product cavity space 51 in a fourth stage as well as being provided on its upper surface with a lower half space of the product cavity space 51 in the third stage, the parallel runner portion 33 in the fourth stage is provided so as to communicate the product cavity space 51 in the third stage with the product cavity space 51 in the fourth stage.

These parallel runner portions 33 are arranged on the same line which is parallel to the mold clamping and mold opening direction of the metal mold 1. Further, each of the parallel runner portions 33 is formed as a taper structure in which its opening cross sectional area is reduced little by little from an upstream side (an upper side in the drawing) of the molding material flow toward a downstream side (a lower side in the drawing), and the gate 41 is provided in the narrowest lower end portion.

FIG. 1 shows a state before injecting a rubber material (an uncross-linked rubber) at the mold opening time of the metal mold 1, and the plate-like fiber substrates 102 are set respectively between the second to sixth split molds 12 to 16, as shown in the state.

Figure 2:
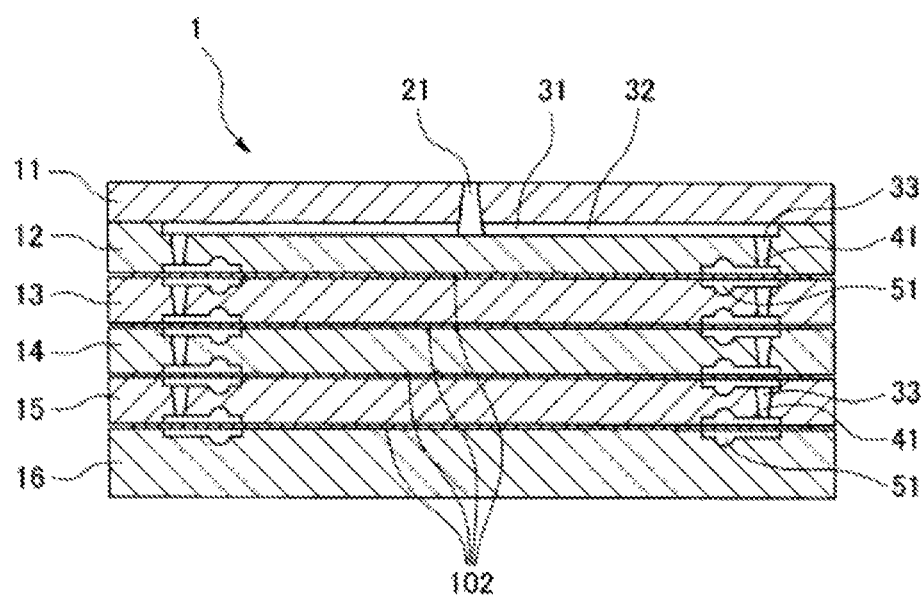
FIG. 2 is a cross sectional view showing a state at the mold clamping time of the metal mold and before injection.

Next, the mold is clamped as shown in FIG. 2, and the plate-like fiber substrates 102 are pinched respectively between the second to sixth split molds 12 to 16. Since the fiber substrate 102 made of the material mentioned above is provided with a flexibility which somewhat deforms in a thickness direction by a mold clamping force, it is possible to absorb a dispersion even if the dispersion in the flatness or the parallelism exists in each of the split molds of the metal mold 1.

Figure 3:
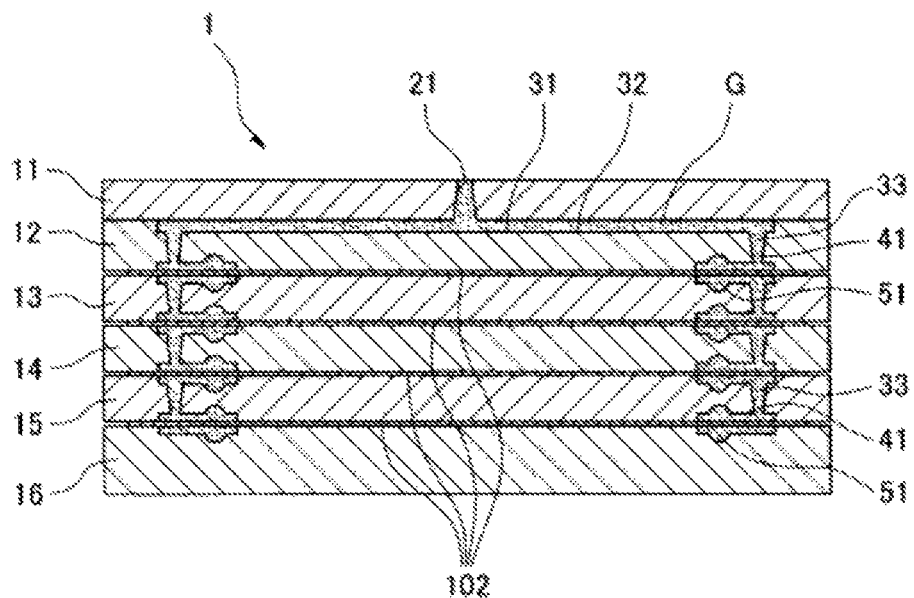
FIG. 3 is a cross sectional view showing a state at the mold clamping time of the metal mold and after injection.
Figure 4:
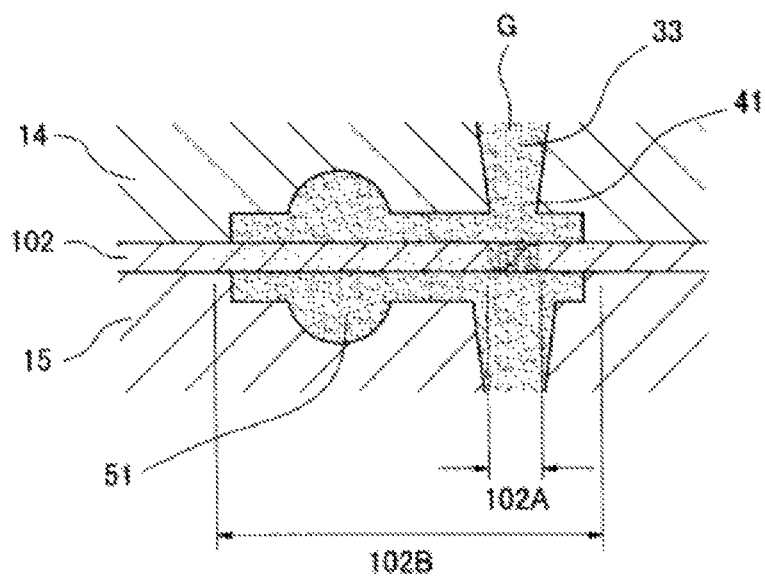
FIG. 4 is a partly enlarged view of FIG. 3.

Next, a rubber material G is injected and the injected rubber material G is filled in the product cavity spaces 51 which extend entirely as shown in FIG. 3. At this time, the flow channel of the rubber material G from the sprue 21 to the sixth mold 16 in the lowest stage comes to a state in which the flow channel is partly closed by the plate-like fiber substrate 102 which are pinched between the second to sixth split molds 12 to 16. However, the injected rubber material G passes through an air gap portion in the fiber substrate 102 by the injection pressure, and finally reaches the sixth mold 16 in the lowest stage. A cross section of the fiber substrate 102 at this time is seen in a micro manner, the air gap in a substrate penetration portion 102A just below the gate 41 through which the rubber material G passes is densely filled with the rubber material G, and the air gap in a rubber material vicinity range (a range in the vicinity of the product cavity space 51 except the substrate penetration portion 102A) 102B is impregnated with the rubber material G as shown in FIG. 4.

Figure 5:
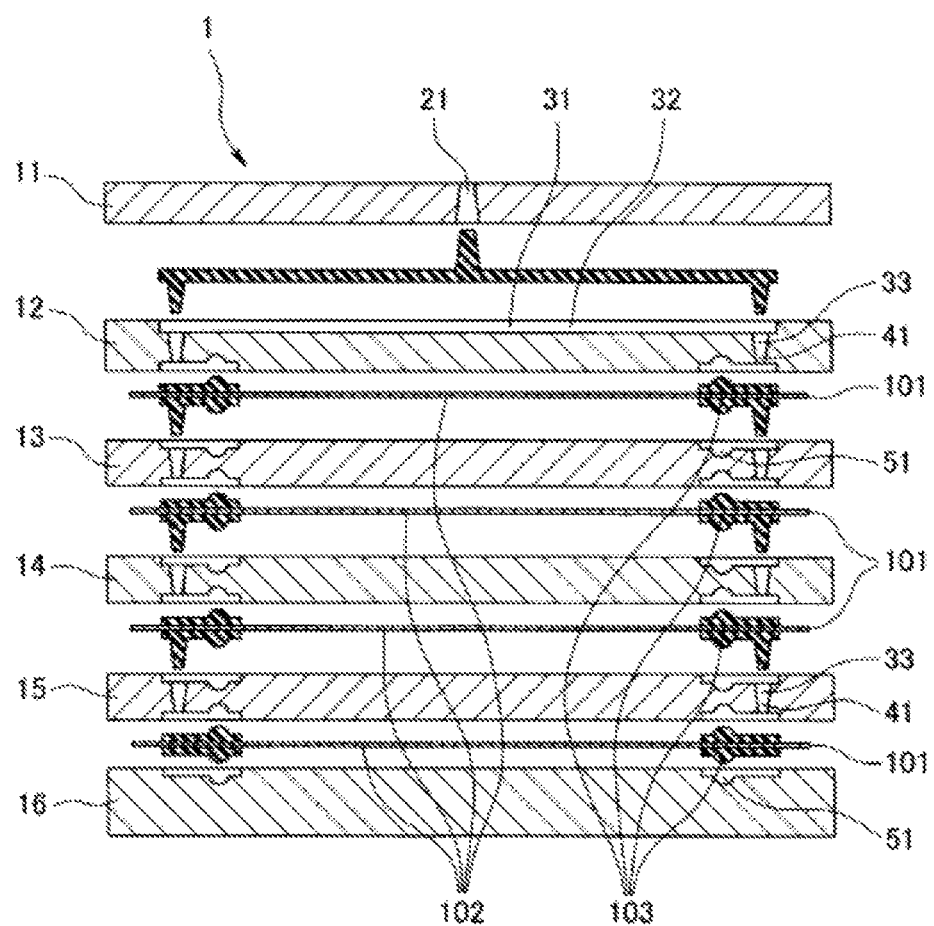
FIG. 5 is a cross sectional view showing a state after injection cross-linking of the metal mold and at the mold opening time.
Figure 6A:
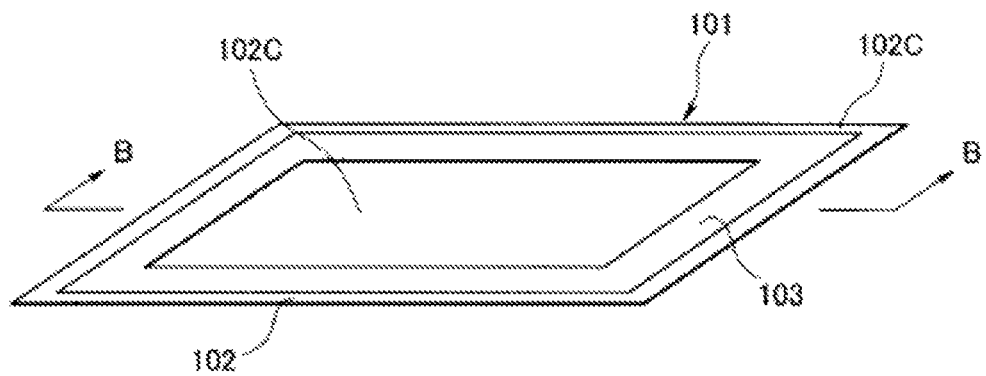
FIG. 6A is a perspective view of a molded product after mold releasing.
Figure 6B:
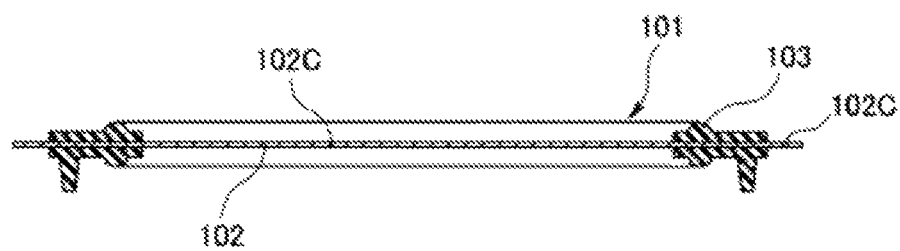
FIG. 6B is a cross sectional view along a line B-B in FIG. 6A.
Figure 7A:
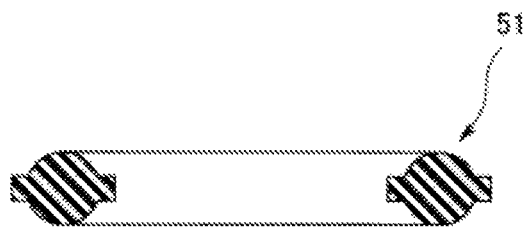
FIG. 7A is a cross sectional view of a gasket according to a prior art.
Figure 7B:
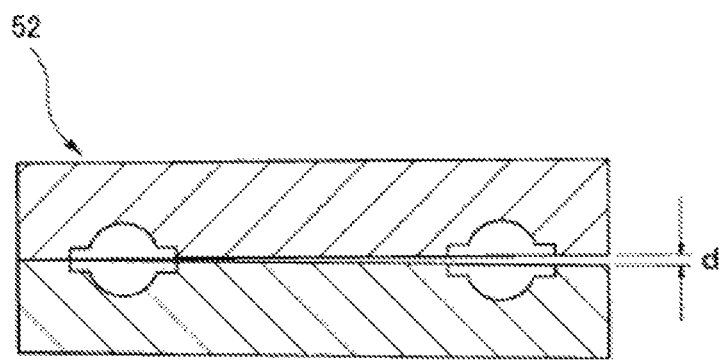
FIG. 7B is a cross sectional view showing a defect generating state of a metal mold according to the prior art.
Figure 7C:
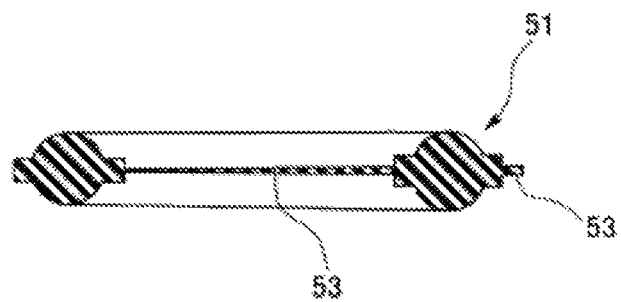
FIG. 7C is a cross sectional view showing a defect generating state of a gasket according to the prior art.

Next, a cross-linking step of the rubber material G is executed, and the mold is further opened. FIG. 5 shows a state at the mold opening time after injection cross-linking, and it is possible to release the molded product (the substrate-integrated gasket) 101 obtained by integrating the fiber substrate 102 constructed by the pulp fiber having the cellulose as the main component and the gasket body 103 constructed by the rubber-like elastic body (the cross-linked rubber) according to the rubber impregnation. Since it is possible to put a handling portion (a portion which is not buried in the gasket body 103 in the fiber substrate 102) 102C shown in FIGS. 6A and 6B to practical use for the mold releasing, it is easy to automate the mold releasing. Further, since the thin film-like rubber burr 53 in the prior art (FIG. 7C) is not generated, it is not necessary to clean the metal mold due to the burr. Further, it is possible to expect a wide man hour reduction by putting the handling portion 102C to practical use even in a step, for example, a carrying step after the mold release.

Figure 6C:
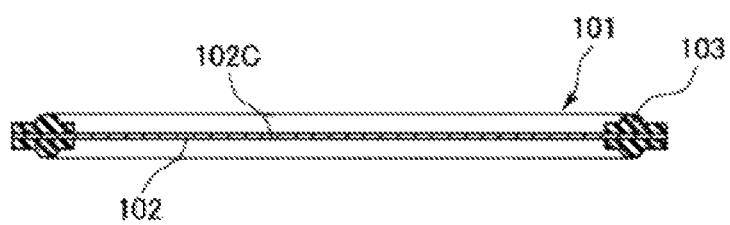
FIG. 6C is a cross sectional view showing a first example after cutting a substrate.
Figure 6D:
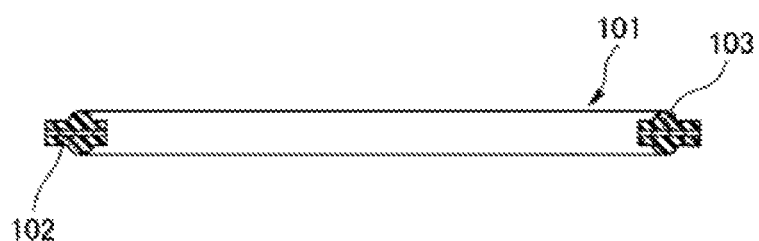
FIG. 6D is a cross sectional view showing a second example after cutting the substrate.

Next, an unnecessary portion for the product is cut from the molded product 101. FIG. 6C shows a shape obtained by cutting an outer peripheral portion of the fiber substrate 102 in the molded product 101 in FIGS. 6A and 6B together with the rubber unnecessary portion, thereby constructing an aspect of the product. Further, FIG. 6D shows a shape obtained by cutting an inner peripheral portion and an outer peripheral portion of the fiber substrate 102 in the molded product 101 in FIGS. 6A and 6B together with the rubber unnecessary portion, thereby constructing an aspect of the product. Therefore, there is the aspect in which the portion which is not buried in the gasket body 103 in the fiber substrate 102 is left partly as the product, and the aspect in which the portion which is not buried in the gasket body 103 is not necessary and is cut entirely. Both the aspects are both included in the gasket according to the present invention.

What is claimed is:

1. A method for manufacturing a substrate-integrated gasket, comprising:
    providing a metal mold including a plurality of split molds, wherein adjacent split molds collectively define cavities that are configured for receipt of an injection molded rubber material;
    providing a plurality of fiber substrates that are each constructed by a pulp fiber having cellulose as a main component between the adjacent split molds;
    forming gasket bodies that are constructed by the rubber material by injecting the rubber material into the cavities between the split molds, the rubber material being impregnated into the fiber substrates at the cavities;
    removing the fiber substrates including the impregnated rubber material from the metal mold; and
    removing portions of the fiber substrates that are not impregnated by the rubber material.

2. The method according to claim 1, wherein the impregnated rubber material immobilizes fiber entanglement of the fiber substrate after cross-linking.

* * * * *